United States Patent [19]
Van Hook

[11] Patent Number: 5,982,939
[45] Date of Patent: *Nov. 9, 1999

[54] ENHANCING TEXTURE EDGES

[75] Inventor: Timothy J. Van Hook, Menlo Park, Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/971,977

[22] Filed: Nov. 17, 1997

Related U.S. Application Data

[63] Continuation of application No. 08/472,216, Jun. 7, 1995, abandoned.

[51] Int. Cl.$^6$ ..................................................... G06K 9/36
[52] U.S. Cl. ........................................... 382/255; 382/266
[58] Field of Search ................................. 382/264, 269, 382/300, 255, 263, 266, 275

[56] References Cited

U.S. PATENT DOCUMENTS

| | | | |
|---|---|---|---|
| 4,704,605 | 11/1987 | Edelson | 340/728 |
| 5,307,450 | 4/1994 | Grossman | 395/130 |
| 5,361,385 | 11/1994 | Bakalash | 395/124 |
| 5,490,240 | 2/1996 | Foran et al. | 395/130 |

Primary Examiner—Andrew W. Johns
Attorney, Agent, or Firm—Sterne, Kessler, Goldstein & Fox P.L.L.C.

[57] ABSTRACT

A system and method of antialiasing edges of a texture that is being projected onto a polygon surface are described. The system operates by determining an initial opacity value of a pixel of the polygon surface as mapped into the texture, and then adjusting the initial opacity value so as to achieve a single pixel wide projected texture edge. This adjustment is performed by determining whether the initial opacity value is less than a threshold, where the threshold represents a desired alpha value of pixels along a projected texture edge. If the initial opacity value is less than the threshold, then a new opacity value of the pixel is set equal to a value denoting full transparency. If, instead, the initial opacity value is greater than the threshold, then a new opacity value of the pixel is set equal to a value denoting full opacity.

15 Claims, 5 Drawing Sheets

ENHANCING TEXTURE EDGES

This application is a continuation of application Ser. No. 08/472,216, filed Jun. 7, 1995, now abandoned.

BACKGROUND OF THE INVENTION

1. Field of the Invention

The present invention relates generally to antialiasing in computer graphics, and more particularly to antialiasing of texture edges.

2. Related Art

As is well known, a texture is a modulation of color, intensity, transparency, and/or other surface properties. A texture is applied to the surface of a graphics object in such a way that the texture appears attached to the surface as the viewpoint, perspective, and magnification of the object varies. Accordingly, textures are used in computer graphics to provide visual detail for surfaces of graphics objects. A texture includes a plurality of texture elements, called texels.

A color value and an opacity value are associated with each texel. A texel's color value (typically comprising red, green, and blue values) denotes the color of the texel. A texel's opacity value (also called the alpha value, or r) denotes the opacity of the texel. Total transparency is typically indicated by an alpha value of zero. Total opaqueness is typically indicated by an alpha value of one. Partial opaqueness is indicated by an alpha value between zero and one.

FIG. 1 is a representation of an example texture 102 having an image of a tree. A portion of an edge of this texture (i.e., a portion of the outline of the tree) is denoted by reference numeral 104. For illustrative purposes, suppose that this texture edge portion 104 is represented by texel 206B shown in FIG. 2 (for purposes of reference, texel 206B is called an edge texel). This texel 206B is straddled by texels 206A and 206C. Note that texels 206A and 206C are non-edge texels, since texel 206A is outside of the tree, and texel 206C is inside the tree. Example alpha values of texels 206A–206C are shown in FIG. 2. Note that the texture edge 104 is characterized by a transition from an alpha value of 0 (in texel 206A) to an alpha value of 1 (in texel 206B).

During magnification operations, each texel may affect multiple pixels of a graphics object, such as a polygon surface. For example, FIG. 2 shows an example where each texel of texture 102 covers (or affects) four pixels. In particular, texel 206B covers pixels 208B–208E. These pixels 208B–208E conventionally represent the texture edge in the resulting, magnified image. Texel 206A covers four pixels, including pixel 208A (the other three pixels are not shown for simplicity). Likewise, texel 206C covers four pixels, including pixel 208F (the other three pixels are not shown for simplicity).

When a texel covers multiple pixels, the texel's color value and alpha value are typically resampled in some manner and applied to all of the covered pixels. In particular, with respect to alpha values and in the case of an edge texel, the alpha value of an edge texel is typically spread among the covered pixels, such that there is a gradual transition (i.e., a ramp up) from an alpha value of 0 to an alpha value of 1.

In the example of FIG. 2, the alpha value of edge texel 206B is spread among pixels 208B–208E, such that the alpha value of pixel 208B is ¼, the alpha value of pixel 208C is ½, the alpha value of pixel 208D is ¾, and the alpha value of pixel 208E is 1. More generally, the alpha value of pixel 208B is 1/N, the alpha value of pixel 208C is 2/N, the alpha value of pixel 208D is (N−1)/N, and the alpha value of pixel 208E is N, where N is equal to the number of pixels covered by each texel (in this case, N is equal to 4). Ramp 216 depicts this ramping up of the alpha values over the projected texture edge (a "projected texture edge" is a texture edge, such as edge 104, that has been applied or projected to a polygon surface).

This typical approach for magnifying textures is not ideal, since the projected texture edges become blurry. Such blurriness results from having a multi-pixel wide projected texture edge, instead of having a single pixel wide projected texture edge. For example, after magnification, the projected texture edge in FIG. 2 is composed of four pixels 208B–208E. Such blurriness in the projected texture edge is a form of aliasing.

Thus, what is required is a system and method of antialiasing texture edges during magnification operations.

SUMMARY OF THE INVENTION

Briefly stated, the present invention is directed to a system and method of antialiasing edges of a texture that is being projected onto a polygon surface. The invention operates by determining an initial opacity value of a pixel of the polygon surface as mapped into the texture, and then adjusting the initial opacity value so as to achieve a single pixel wide projected texture edge.

This adjustment is performed by determining whether the initial opacity value is less than a threshold, where the threshold represents a desired alpha value of pixels along a projected texture edge. If the initial opacity value is less than the threshold, then a new opacity value of the pixel is set equal to a value denoting full transparency. If, instead, the initial opacity value is greater than the threshold, then a new opacity value of the pixel is set equal to a value denoting full opaqueness.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method of antialiasing texture edges. The invention is particularly well suited for use during computer graphic magnification operations that result in the ratio of texels to pixels (i.e., texels/pixels) to be less than one. In other words, the invention is particularly well suited for use during magnification operations that result in each texel covering multiple pixels. However, it should be understood that the invention can be used in other applications, as will be apparent to persons skilled in the relevant art(s).

According to the present invention, each texel of a texture includes a color value and an alpha value. The color and alpha values may be encoded in any well known manner, or may alternatively be stored in an unencoded form. During magnification operations, the invention operates to compute the threshold between an alpha value of 0 and an alpha value of 1 (i.e., the invention identifies texture edge boundaries), and also operates to provide a smooth transition along this threshold. Accordingly, the invention provides a resulting, magnified image having an antialiased, single pixel wide projected texture edge.

Figure 3:
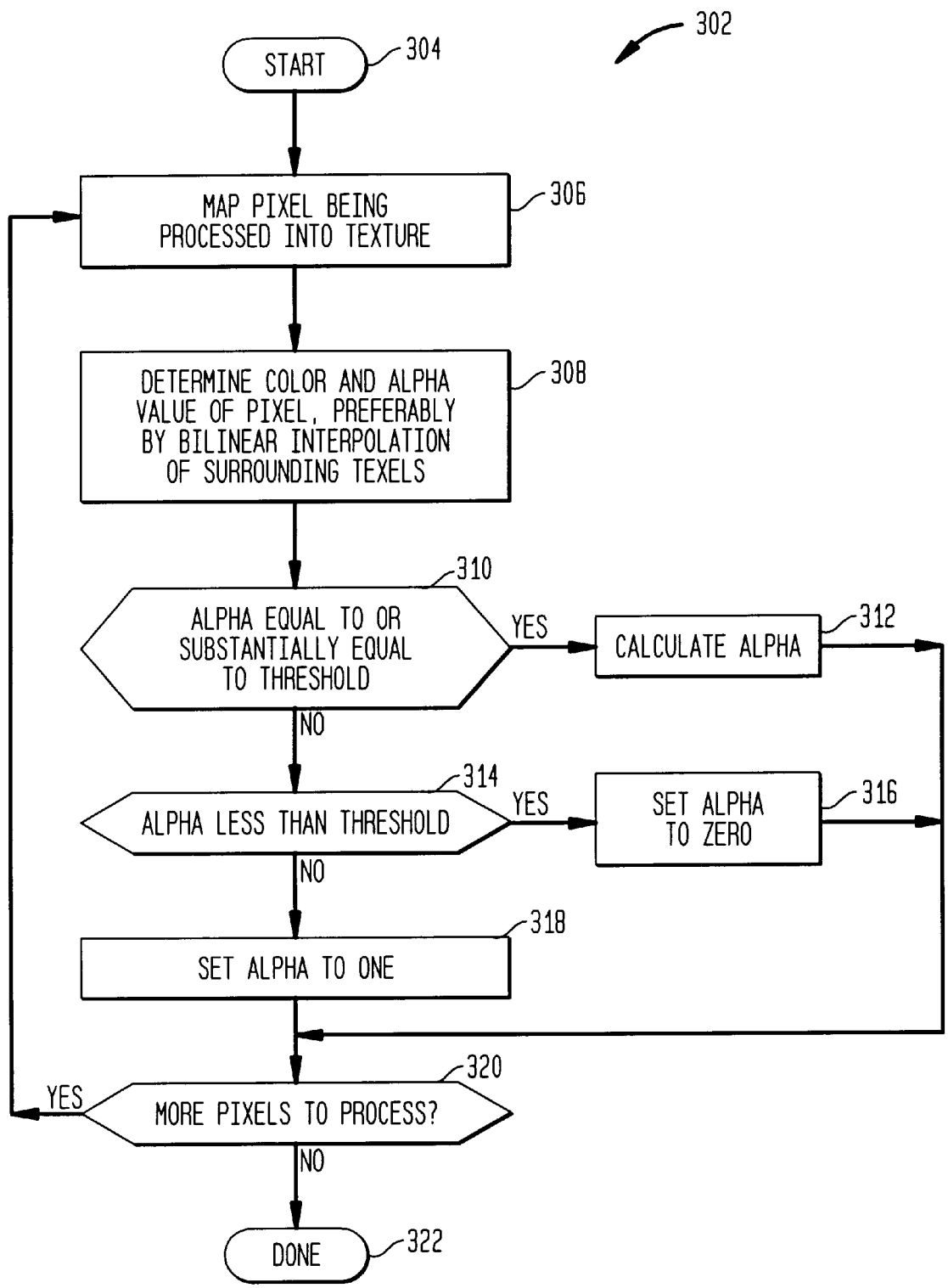
FIG. 3 is a flowchart representing the preferred operation of the invention.

The operation of the invention shall now be described in detail with reference to a flowchart 302 in FIG. 3. The steps of flowchart 302 are performed for each texture in each object of the image being magnified. For illustrative purposes, flowchart 302 is described below with reference to a texture 402 being applied to a polygon surface 404 shown in FIG. 4. In this example, the polygon surface 404 is being magnified such that each texel of the texture 402 covers four pixels of the polygon surface 404. For reference purposes, individual texels are indicated by their (S,T) coordinates, where S is the horizontal axis and T is the vertical axis. Similarly, individual pixels are indicated by their (X,Y) coordinates, where X is the horizontal axis and Y is the vertical axis. Flowchart 302 begins with step 304, where control passes to step 306.

In step 306, a pixel (2,3) (denoted by reference number 408) currently being processed is mapped into the texture 402 (note that each pixel in the polygon surface 404 is processed in turn). As noted above, in the example of FIG. 4, each texel of the texture 402 covers four pixels in the polygon surface 404. Preferably, the polygon surface 404 is segmented into groups of four pixels. These groupings are indicated by lines 406. Each group of four pixels maps to one of the texels in the texture 402. This mapping is preferably conducted according to a relative positional basis. Thus, pixels (0,0), (0,1), (1,0), and (1,1) map to texel (0,0), pixels (6,6), (6,7), (7,6), and (7,7) map to texel (3,3), etc.

Also, pixels (2,2), (2,3), (3,2), and (3,3) map to texel (1,1). In particular, pixel (2,3) maps to a position 409 that is in the upper left quadrant of texel (1,1), as shown by mapping indicator line 401. This is the case, since pixel (2,3) is positioned in the upper left corner of the group containing pixels (2,2), (2,3), (3,2), and (3,3).

Any well known mapping procedure or algorithm may be used to map pixel (2,3) into the texture 402. Accordingly, implementation of step 306 will be apparent to persons skilled in the relevant art(s).

In step 308, the color value and alpha value of the pixel (2,3) as mapped into the texture 402 are determined (the alpha value is an initial value, as it is adjusted in the following steps). Any well known procedure for color value determination may be used in step 308. The following discussion focuses on the manner in which the alpha value is determined for pixel (2,3).

Figure 4:
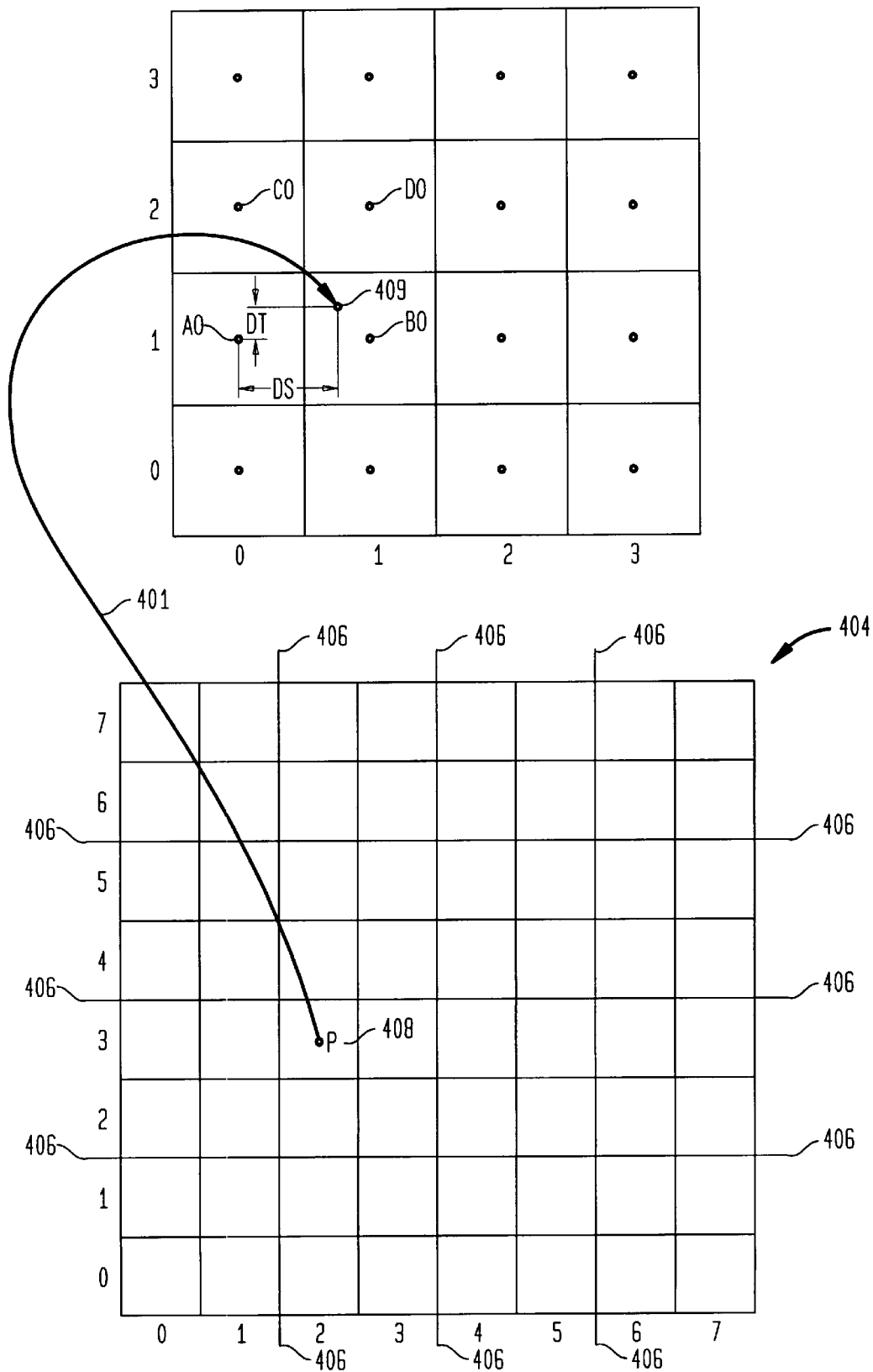
FIG. 4 depicts another example representation of an application of a texture to a surface.

Preferably, in step 308 a bilinear interpolation procedure is used to determine the alpha value of pixel (2,3). (It should be understood, however, that other interpolation procedures could alternatively be used. For example, linear interpolation can be used if the texture image is magnified in one direction. Also, higher order interpolation filters in one, two, or more dimensions can be used.) Preferably, the four nearest texels (0,1), (0,2), (1,1), and (1,2) in the texture 402 having centers that form a polygon around the position 409 of the pixel (2,3) as mapped into the texture 402 are used to determine the alpha value of pixel (2,3). In the example of FIG. 4, the alpha value (called the interpolated alpha value) of pixel (2,3) is preferably calculated as follows:

$$\text{Interpolated Alpha Value} = A0*(1-DS)(1-DT) + B0*(DS)(1-DT) + C0*(1-DS)(DT) + D0*(DS)(DT) \quad \text{Equation 1}$$

where A0, B0, C0, and D0 are the alpha values of texels (0,1), (1,1), (0,2), and (1,2), respectively, DS is the horizontal distance from the center of texel (0,1) to position 409, and DT is the vertical distance from the center of texel (0,1) to position 409.

Bilinear interpolation is well known, and is described in a number of publicly available documents, such as *Digital Image Processing*, Kenneth R. Castleman, Prentice-Hall, Englewood Cliffs, N.J., 1979. Other interpolation schemes can alternatively be used to calculate the alpha value of pixel (2,3), such as bicubic interpolation or other higher-order interpolation functions. Such interpolation schemes are well known, and are described in a number of publicly available documents, such as *Digital Image Processing*, Kenneth R. Castleman, cited above.

In step 310, the interpolated alpha value (determined in step 308) is compared to a previously determined threshold. This threshold represents the desired alpha value of the pixel at the edge of the texture 402 as projected onto the polygon surface 404. The value of the threshold is set by the user. Accordingly, if the user wishes the pixel corresponding to the edge of the projected texture to have an alpha value equal or very close to 0.45, for example, then the user sets the threshold to be equal to 0.45. Preferably, the value of the threshold is equal to 0.5, i.e., the middle value between the edge of the texture image defined by alpha values of 0 and 1.

If it is determined in step 310 that the interpolated alpha value is equal to or substantially equal to the threshold, then the interpolated alpha value is recalculated in step 312, preferably according to the following equation (in which the interpolated alpha value is represented by r): ((r-0.5)/L)+0.5. L is equal to 1/N, where N is equal to the number of pixels covered by each texel. N may be a distance on one or more axes of the texture image, a maximum of such distances, or a diagonal length of a polyhedron on such axes, or other metrics, as is well known in texture mapping. In the example of FIG. 4, N is equal to 4. Step 320 is performed after the completion of step 312 (step 320 is described below). If L is greater than 1, which means that N is less than 1, which means that the texture image is not being magnified, then the interpolated alpha is used for the pixel alpha.

If it is determined in step 310 that the interpolated alpha value is sufficiently less than the threshold (indicating that the pixel (2,3) is outside the texture edge), then step 316 is performed. In step 316, the alpha value of pixel (2,3) is set to zero. Step 320 is then performed (described below).

If the interpolated alpha value is sufficiently greater than the threshold (indicating that the pixel (2,3) is inside the texture edge), then step 318 is performed. In step 318, the alpha value of pixel (2,3) is set to one. Step 320 is then performed (described below).

The operations performed in steps 310, 312, 314, 316, and 318, just described, are collectively represented by the following equation. Accordingly, in steps 310, 312, 314, 316, and 318, the following equation is solved to determine the alpha value of pixel (2,3):

New alpha value=Clamp(0, ((r-0.5)/L)+0.5, 1)   Equation 2

For reference purposes, the variable Y is used to represent the following expression (from the above equation): ((r-0.5)/L)+0.5). The Clamp function in the above equation operates to return ((r-0.5)/L)+0.5) when the following condition is true: $0 \leq Y \leq 1$. When Y is less than 0, the New alpha value is set equal to 0 (i.e., clamped to zero). When Y is greater than 1, the New alpha value is set equal to 1 (i.e., clamped to one).

Figure 8:
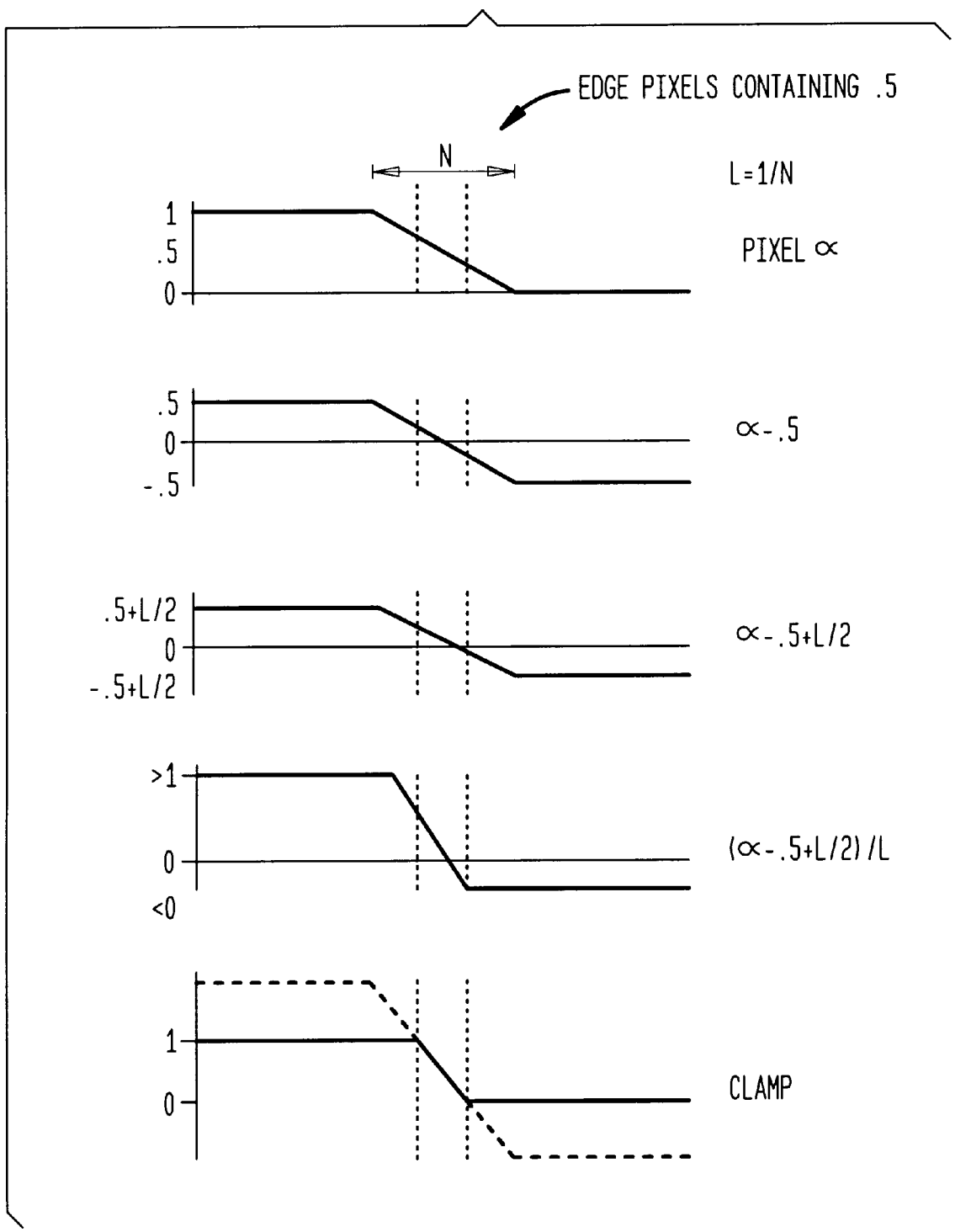
FIG. 8 is used to illustrate the theory of the invention.

The theory of Equation 2 is as follows. When an alpha texture is being magnified, the change in alpha over a pixel where alpha is between 0 and 1 (an edge pixel) is L or 1/N or the number of pixels per texel. The range of alpha values in such an edge pixel which crosses the threshold of opacity T (such as 0.5) is T plus or minus L/2, or half the texel per pixel distance. Subtracting T from the pixel alpha plus L/2 normalizes the pixel's value to the range of 0 to L. Dividing this value by L then normalizes the pixel containing the threshold to an alpha value of 0 to 1. This resultant value is a single pixel wide antialiased texture edge, whose value varies between 0 and 1 in proportion to the distance between the pixel alpha and the threshold. These relationships are illustrated in FIG. 8.

In step 320, it is determined whether there are any remaining pixels in the polygon surface 404 left to process. If there are more pixels to process, then control returns to step 306. Otherwise, flowchart 302 is complete, as indicated by step 322.

Figure 1:
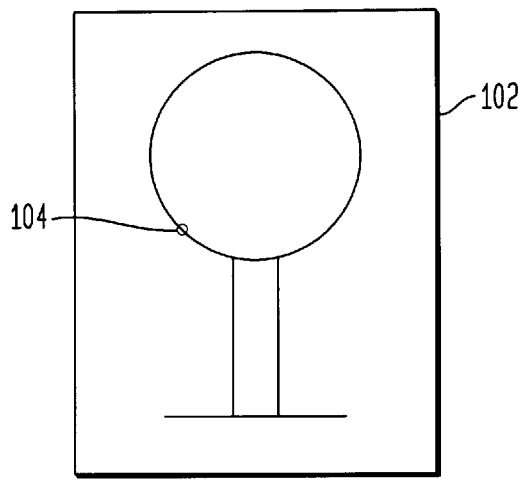
FIG. 1 depicts an example texture.
Figure 2:
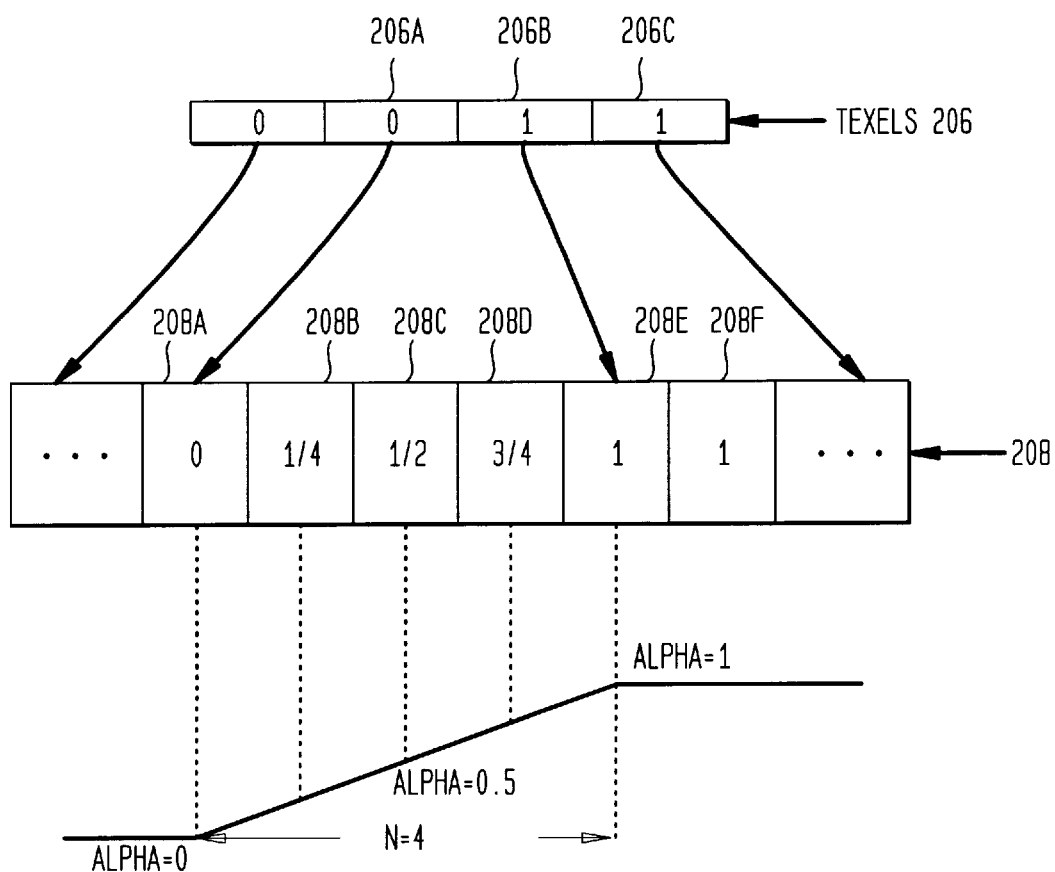
FIG. 2 depicts an example representation of an application of a texture to a surface.
Figure 7:
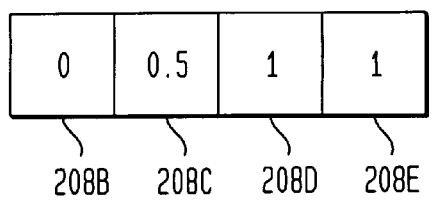

The operation of the invention, as described above, results in generating a resulting, magnified image having an antialiased, single pixel wide projected texture edge. This can be illustrated by solving Equation 2 for the pixels 208 in FIG. 2, particularly pixels 208B–208E corresponding to the edge texel 206B of the texture 102. In this case, N is equal to 4, such that L is equal to 0.25. Accordingly, the new alpha values of texels 208B, 208C, 208D, and 208E are 0, 0.5, 1, and 1, respectively, as shown in FIG. 7. As should be clear, pixel 208C in FIG. 7 represents the edge of the projected texture (since it represents the transition from an alpha value of zero to an alpha value of one). Thus, the invention results in a single pixel wide projected texture edge, rather than a multi-pixel wide projected texture edge (as is the case in FIG. 2).

Note that the alpha value of the pixel corresponding to the edge texel in the projected texture ranges between 0 and 1, depending on the extent to which the alpha value of the edge texel is displaced from the threshold.

Figure 5:
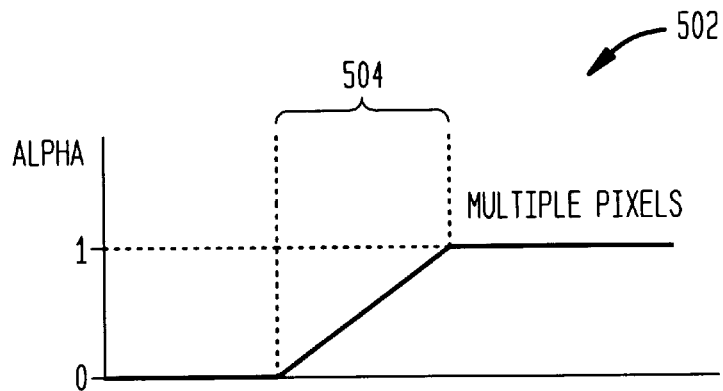
FIGS. 5–7 are used to illustrate the effects and advantages of the present invention.
Figure 6:
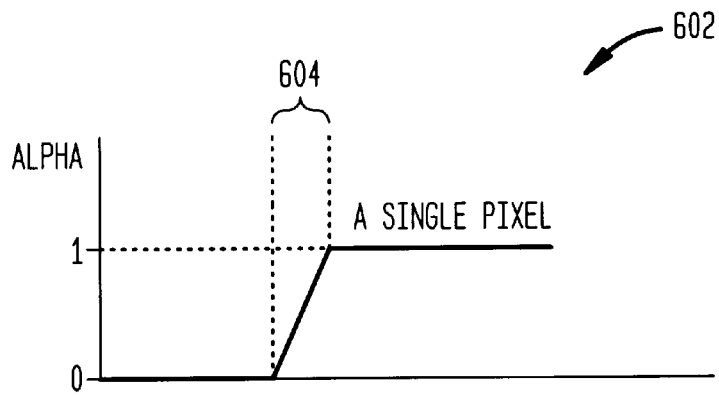

This effect of the invention is graphically represented in FIGS. 5 and 6. FIG. 5 corresponds to the situation existing in FIG. 2, where the transition from an alpha value of 0 to an alpha value of 1 spans multiple pixels (this transition is denoted by reference numeral 504 in FIG. 5). In contrast, FIG. 6 corresponds to the situation existing in FIG. 7, where the transition from an alpha value of 0 to an alpha value of 1 spans a single pixel (this transition is denoted by reference numeral 604 in FIG. 6).

The invention as described herein can be implemented using a processor operating according to control logic, such as software. Other implementations of the invention are possible. For example, the invention can be implemented as a hardware state machine, or as a combination of hardware logic and software logic. These and other implementations will be apparent to persons skilled in the relevant art(s).

While various embodiments of the present invention have been described above, it should be understood that they have been presented by way of example only, and not limiting. Thus, the breadth and scope of the present invention should not be limited by any of the above-described exemplary embodiments, but should be defined only in accordance with the following claims and their equivalents.

What is claimed is:

1. A method of reducing blurriness of edges, comprising the steps of:
    (1) mapping a pixel of a polygon surface into a texture;
    (2) determining an opacity value of said mapped pixel; and
    (3) enhancing an edge of the texture, including:
        (i) calculating a new opacity value of said mapped pixel to achieve a single pixel wide projected texture edge; and
        (ii) assigning said new opacity value to said mapped pixel.

2. The method of claim 1, further comprising the step of:
    (4) performing steps (1)–(3) for each pixel of said polygon surface.

3. The method of claim 1, wherein step (2) comprises the step of:
    (a) identifying a plurality of texels of said texture being nearest to said mapped pixel and having centers that form a polygon around said mapped pixel; and
    (b) interpolating alpha values of said texels to determine an alpha value of said mapped pixel.

4. The method of claim 3, wherein step (b) comprises the steps of:
    using bilinear interpolation techniques to interpolate said alpha values of said texels to determine said alpha value of said mapped pixel.

5. The method of claim 1, wherein step (3) comprises the steps of:
    determining whether said opacity value of said mapped pixel is less than a threshold, said threshold representing a desired alpha value of pixels along a projected texture edge;
    if said opacity value of said mapped pixel is less than said threshold, then setting said opacity value of said mapped pixel equal to a value denoting full transparency;
    determining whether said opacity value of said mapped pixel is greater than said threshold; and
    if said opacity value of said mapped pixel is greater than said threshold, then setting said opacity value of said mapped pixel equal to a value denoting full opaqueness.

6. The method of claim 1, wherein step (3) comprises the step of:
    adjusting said opacity value of said mapped pixel according to the following relationship:

Adjusted opacity value=Clamp(0, ((r-0.5)/L)+0.5, 1);

where r represents said opacity value of said mapped pixel, and L is equal to 1/N, where N is equal to the number of pixels of said polygon surface covered by each texel of said texture.

7. A system for reducing blurriness of edges, comprising:
    a pixel mapper to map a pixel of a polygon surface into a texture;
    an opacity value determinator to determine an opacity value of said mapped pixel; and a texture edge enhancer, including:
an opacity value calculator to calculate a new opacity value for said mapped pixel to achieve a single pixel wide projected texture edge; and
an opacity value setter to set said opacity value of said mapped pixel equal to said new opacity value.

8. The system of claim 7, wherein the opacity value determiner comprises:
a texel identifier to identify a plurality of texels of said texture being nearest to said mapped pixel and having centers that form a polygon around said mapped pixel; and
an interpolator to interpolate alpha values of said texels to determine an alpha value of said mapped pixel.

9. The system of claim 8, wherein said interpolator comprises:
means for using bilinear interpolation techniques to interpolate said alpha values of said texels to determine said alpha value of said mapped pixel.

10. The system of claim 7, wherein said opacity value calculator comprises:
means for determining whether said opacity value of said mapped pixel is less than a threshold, said threshold representing a desired alpha value of pixels along a projected texture edge;
means for setting said opacity value of said mapped pixel equal to a value denoting full transparency if said opacity value of said mapped pixel is less than said threshold;
means for determining whether said opacity value of said mapped pixel is greater than said threshold; and
means for setting said opacity value of said mapped pixel equal to a value denoting full opaqueness if said opacity value of said mapped pixel is greater than said threshold.

11. The system of claim 7, wherein said opacity value calculator comprises:
means for calculating said opacity value of said mapped pixel according to the following relationship:

Calculated opacity value=Clamp(0, ((r-0.5)/L)+0.5, 1);

where r represents said opacity value of said mapped pixel, and L is equal to 1/N, where N is equal to the number of pixels of said polygon surface covered by each texel of said texture.

12. A method of reducing blurriness of edges, comprising the steps of:
(1) determining an opacity value of a pixel of a polygon surface as mapped into a texture; and
(2) calculating said opacity value, comprising the steps of:
(a) determining whether said opacity value is less than a threshold, said threshold representing a desired alpha value of pixels along a single pixel wide projected texture edge;
(b) if said opacity value is less than said threshold, then setting a new opacity value of said pixel equal to a value denoting full transparency;
(c) determining whether said opacity value is greater than said threshold; and
(d) if said opacity value is greater than said threshold, then setting a new opacity value of said pixel equal to a value denoting full opaqueness.

13. A system for reducing blurriness of edges, comprising:
means for determining an opacity value of a pixel of a polygon surface as mapped into a texture; and
means for enhancing an edge, including:
means for calculating a new opacity value, comprising:
means for determining whether said opacity value is less than a threshold, said threshold representing a desired alpha value of pixels along a single pixel wide projected texture edge;
means for setting said new opacity value of said pixel equal to a value denoting full transparency if said opacity value is less than said threshold;
means for determining whether said opacity value is greater than said threshold; and
means for setting said new opacity value of said pixel equal to a value denoting full opaqueness if said opacity value is greater than said threshold.

14. A method of reducing blurriness of edges, comprising the steps of:
(1) mapping a pixel of a polygon surface into a texture;
(2) determining an initial opacity value of said mapped pixel by calculating an alpha value by bilinear interpolation; and
(3) enhancing a texture edge to achieve a single pixel wide projected texture edge so as to reduce blurriness caused by magnification of graphics objects, including the steps of:
(a) calculating a new opacity value of said mapped pixel to achieve a single pixel wide projected texture edge; and
(b) setting an opacity value of said mapped pixel equal to said new opacity value.

15. A method of reducing blurriness of edges, comprising the steps of:
(1) mapping a pixel of a polygon surface into a texture;
(2) enhancing a texture edge, comprising:
(a) calculating a new opacity value of said mapped pixel so as to achieve a single pixel wide projected texture edge; and
(b) setting an opacity value of said mapped pixel equal to said new opacity value.

* * * * *